United States Patent [19]
Watkins

[11] Patent Number: 5,921,159
[45] Date of Patent: Jul. 13, 1999

[54] ROTATING TURRET FOR AN ENGINE LATHE

[76] Inventor: Johnny Ralph Watkins, 189 LaRoss Dr., Canton, Ga. 30114

[21] Appl. No.: 09/025,121

[22] Filed: Feb. 17, 1998

[51] Int. Cl.[6] .................................................. B23B 29/24
[52] U.S. Cl. .................................. 82/159; 82/160; 29/40; 408/35
[58] Field of Search .............................. 82/159, 121, 128, 82/160; 29/27 C, 35.5, 39, 40; 408/35; 279/123

[56] References Cited

U.S. PATENT DOCUMENTS

| 3,088,351 | 5/1963 | Schardt | 82/159 |
|---|---|---|---|
| 4,090,281 | 5/1978 | Hautau | 408/35 X |
| 4,570,313 | 2/1986 | Holmstrom et al. | 29/27 C X |
| 5,015,003 | 5/1991 | Ramunas | 279/123 |
| 5,455,993 | 10/1995 | Link et al. | 29/40 |

*Primary Examiner*—Andrea L. Pitts
*Assistant Examiner*—Henry W. H. Tsai
*Attorney, Agent, or Firm*—Bernstein & Associates

[57] ABSTRACT

A rotating turret (10) having an outer plate (12) with several interchangeable tool (13) posts mounted to an index plate (22). The index plate (22) is mounted to a first axle (23) that extends through a block (24) and rotates on a set of bearings (28) mounted inside the block (24). The index plate (22) provides for rotation of the turret (10) between the several tool (13) positions. The index plate (22) is locked into position by a set of pins (34, 37) that fit into apertures (31) in the index plate. The pins (34, 37) are spring-biased toward the index plate (22) by springs (52, 55, and 58). A handle (16) attaches to a second axle (40) to provide a quick release mechanism. The second axle (40) mechanically engages with the pins (34, 37) and a sliding wedge (49) such that when the handle (16) is rotated the pins (34, 37) are retracted from the index plate (22) against the force of the springs (52, 55, 58).

26 Claims, 5 Drawing Sheets

ROTATING TURRET FOR AN ENGINE LATHE

FIELD OF THE INVENTION

The present invention relates to machining equipment, and more particularly, to a rotating turret for an engine lathe.

BACKGROUND OF THE INVENTION

An engine lathe is a machine in which a piece of metal to be worked is rotated about a horizontal axis and is shaped by contact with a fixed cutting, boring or drilling tool. For manual machine operations, the tools are normally held by a tool holder that is attached to a sliding bed that is movable in two dimensions. The tool holder is positioned such that the center of the tool coincides with the centerpoint of the spindle of the lathe. The centered position is the reference point, and all measurements of the movements of the bed in either the X or Y direction are made relative to the reference point. In this manner the movement of the tool holder can be measured and controlled to provide for accurate cutting, drilling, and boring. A rotating turret is a tool holder for use with an engine lathe and that typically has six to eight (more or less are possible) tool positions that can be rotated in order to switch from one tool to another. For a rotating turret one of the tool holders is positioned to correspond with the centerpoint of the spindle of the lathe and as a result all of the tools are on center when rotated into this position.

The rotating turret enables the machinist to make use of several tools for changes "on the fly" without having to remove and replace the tools in a single head on the tool holder. In rotating turret systems, the turret is disengaged from its locked position, rotated into the desired position, and then placed in the locked position again.

In order to provide for indexing between different tool positions on a rotating turret, a device must provide for locking and unlocking of the rotating turret and for rotation of the turret. The existing systems, such as the Dorian VIT available from Dorian Tool in Houston, Tex., usually provide for locking and unlocking the turret by means of a set of interlocking gear plates. The gear plates may be spline gears or other types of gear faces that bring together several surfaces to prevent relative rotation between the plates. In order to disengage the locking mechanism, one of the plates has to be retracted. Some of the existing systems require the steps of: rotating the knurled handle in order to disengage the gear plates, rotating the turret into the next position and then rotating the knurled handle again to lock the turret into the next position. These steps can become very tedious when several tool changes are required.

Once the locking mechanism is disengaged, the movement of the turret is usually restrained in some manner. If the turret is allowed to spin freely once the locking mechanism is disengaged, the weight of the tools may cause them to rotate unexpectedly and to cause damage to the work or the operator. Many of the existing systems do not adequately protect the work from damage due to inadvertent rotation of the turret when the locking mechanism is disengaged.

The movement of the turret between the different tool positions is accomplished in several different ways in the existing systems. Some systems require manual indexing by unlocking the turret and manually rotating the turret between tool positions. Other systems provide for automatic indexing through the use of compressed air. The air systems are not completely satisfactory because they can be quite cumbersome and require a lot of space that may not be available in all instances and especially for retrofitting to existing lathes.

Switching tools and indexing a turret with the existing systems has generally not been as efficient and easy as it should be because of the requirements and limitations of the rotating turret designs discussed above. What is needed is a rotating turret for an engine lathe that provides a quick and user friendly locking mechanism, improves the method of engaging and disengaging the locking mechanism, employs a locking mechanism that provides rigidity and stability to the tools, provides protection for the work when the locking mechanism is disengaged, and provides a low maintenance, durable design for a rotating turret.

SUMMARY OF THE INVENTION

Generally described, the present invention provides an improved design for a rotating turret for an engine lathe featuring a quick release mechanism and a pair of spring loaded pins for locking the turret in position.

In a preferred embodiment, the present invention provides a rotating turret for an engine lathe that is supported from a block having a first opening for an axle, a second opening for a locking pin, and a third opening for a locking pin. The axle is supported and rotated by a set of bearings that are positioned inside the first opening in the block. An index plate is connected to the axle and combines with an outer plate to form the rotating turret. The index plate has a plurality of apertures defined therein which provide for engagement with a set of locking pins, for attachment to the outer plate, and for engagement with a detent mechanism. The inside of the index plate that faces the block has a raised bearing surface which is disposed in a concentric circle with respect to the index plate and has slots in it at predetermined intervals around the circle.

A first locking pin fits through the second opening in the block and is capable of fitting into one of the apertures in the index plate to lock the turret in a particular position. The first locking pin has a cylindrical projection extending from its surface at one end. The cylindrical projection rides on the bearing surface on the inside of the index plate when the rotating turret is disengaged from and able to rotate freely about the block.

A second axle has a handle connected to it and is mechanically engaged with the first pin such that when the handle is rotated the first pin retracts from the aperture in the index plate and the projection retracts from the slot in the bearing surface. The second axle is spring-biased to cause the first pin to move forward into the aperture in the index plate. When the handle is turned to disengage the first pin and the projection from the index plate, the turret can be rotated slightly to enable the projection to make contact with the bearing surface on the index plate and to ride along the surface until the next slot in the bearing surface is reached. Accordingly, the projection slides on the bearing surface and the first and second pin do not have any contact with the index plate while the turret is rotating.

While the projection is in contact with the bearing surface, the first pin is being urged toward the index plate by the spring but the bearing surface is holding the first pin back from the index plate. Accordingly, the handle can be released and the turret will not lock into position until the projection travels across the bearing surface to the next slot. If the operator does not want the turret to lock in place at the next slot, the operator has to hold the handle in the unlocked position while rotating the turret for as many revolutions as desired.

If the operator disengages the locking mechanism and then releases the handle, the engagement of the projection with the slot in the bearing surface prevents the turret from rotating beyond the next tool position. As soon as the projection finds the next slot it will shoot forward under the force of the springs and the pins will enter the index plate at the same time. Accordingly, there is protection against sudden unexpected movement of the turret. A detent mechanism is provided as an additional protection against unexpected rotation that could cause injury or damage to the work. The detent mechanism comprises a spring-loaded ball engaging with a series of cuplike openings in the back of the index plate. The tension on the spring is adjustable by means of a setscrew that is accessible from the back of the block.

A second pin fits through the third opening in the block and into one of the apertures in the index plate. The second pin locks the index plate in position and provides a moment arm to increase the rigidity of the turret during machining operations. The second pin has a slot cut through approximately the middle of the pin. The slot is slightly angled at the front end and the back end. Also, the pin is spring-biased toward the index plate by a spring that is attached to the back of the pin and is positioned on the back of the block.

A sliding wedge mechanically engages with the second axle and is capable of frictionally engaging with the slot in the second pin such that when the handle is rotated the second pin retracts from the aperture in the index plate. The sliding wedge retracts the second pin by the action of a curved end of the wedge engaging the surface inside the slot. As the wedge is pulled through the slot, the curved end pushes the second pin out and away from the index plate. As the wedge pushes the second pin away from the index plate, the spring compresses.

In the preferred embodiment, the sliding wedge is also spring-biased such that when the second pin is retracted the spring contacting the sliding wedge is also compressed.

In operation, when the handle on the second axle is turned, a gear connected to the second axle engages with a set of gear teeth on the first pin and the first pin is retracted from an opening in the index plate against the force of a spring. Simultaneously, a gear tab on the second axle mechanically engages with a shoulder on the sliding wedge to pull the sliding wedge through the slot in the second pin. As the wedge travels through the slot in the second pin it pushes the second pin away from the index plate against the force of a spring. Both the second pin and the sliding wedge are spring-biased toward the locked position. Once the handle is turned and the two pins retract from the index plate, the turret is in the unlocked position and can rotate freely about the first axle. The turret can be maintained in the free rotating position by keeping pressure on the handle to overcome the force of the springs. By unlocking the turret with the handle and rotating the turret slightly, the projection on the first pin can be removed from the slot and engaged with the bearing surface on the inside of the index plate. In this manner the contact between the projection on the first pin and the bearing surface prevents the springs from pushing the first pin or the second pin into the index plate and therefore, enables the operator to release the handle and still be able to rotate the turret. With the handle released, the turret can only be rotated for a portion of the arc of the turret. Once the turret has been rotated enough of the arc to reach the next tool position, a slot cut into the bearing surface allows the projection to shoot forward into the slot under the force of the springs.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
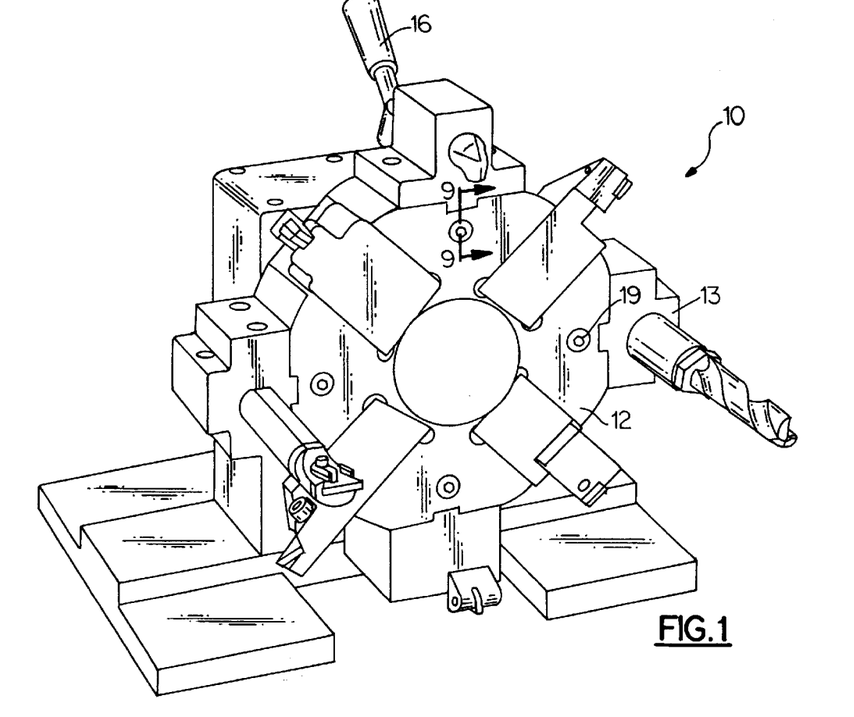
FIG. 1 is a perspective view of the rotating turret of the present invention.

In FIG. 1, a rotating turret 10 preferably has eight tool positions (more or less are possible) located around the circumference of an outer plate 12. The rotating turret 10 is mounted to an engine lathe (not shown) and is used to increase the speed and flexibility of the manual machining process. A set of removable tools 13 for cutting, boring, or drilling are mounted to the outer plate 12. By having a rotating turret 10, switching tools 13 for different machining operations is made simpler and faster. In order to change from one tool to another, the handle 16 is turned and then the turret 10 is rotated until the desired tool 13 is in the correct position. In this manner, several tools 13 (up to eight for this example) are available for use by the operator without requiring any dead time in installing or removing and reinstalling different tools 13. The only time that tools 13 have to be installed is when more than eight tools 13 are needed, and this tool change can be accomplished by means of a mechanical fastener such as an Allen screw 19 accessible through the front of the outer plate 12.

The rotating turret 10 can be installed as part of a new lathe or can be easily retrofit to an existing machine. Installation of the rotating turret 10 requires that one of the tool positions be centered according to the center height of the spindle of the engine lathe. Once this position has been centered all of the other tools 13 will automatically be positioned at the correct height when they are rotated into position.

Figure 2:
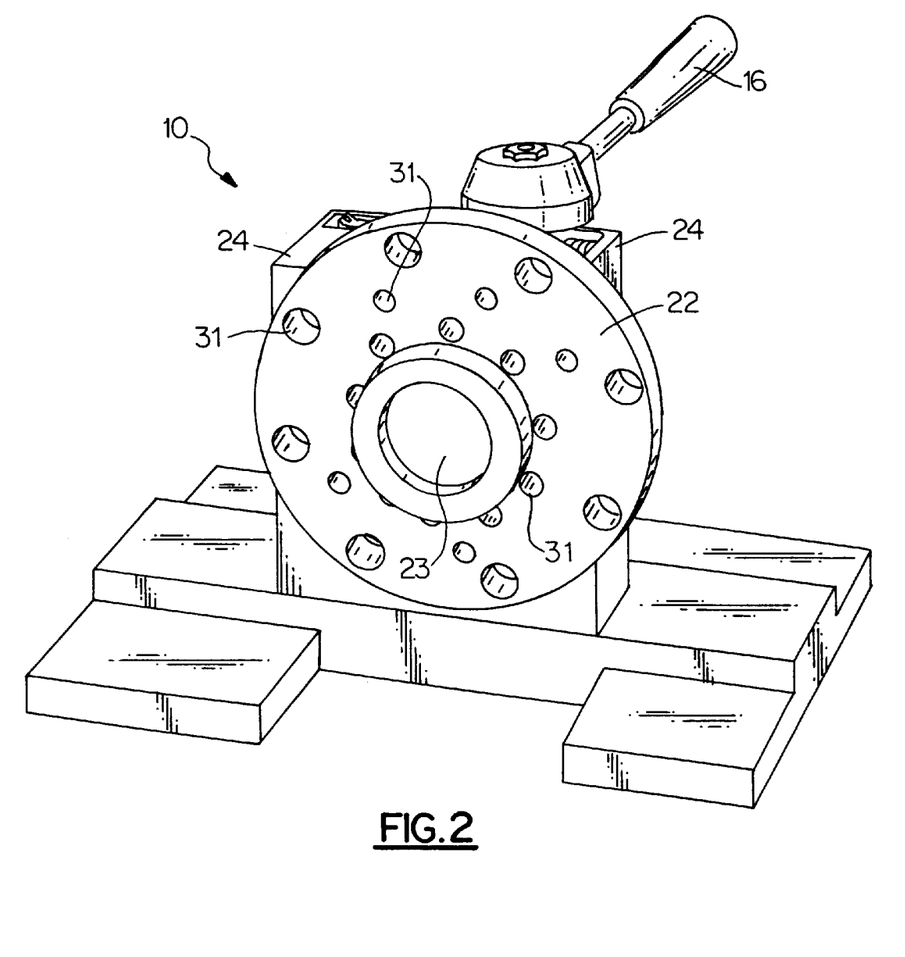
FIG. 2 is a perspective view of the rotating turret of the present invention with the outer plate removed.

In FIG. 2, the turret 10 is shown with the outer plate 12 removed. Nesting behind and removably attached to the outer plate 12 is an index plate 22. The index plate 22 is fixedly attached to or integrally formed with a first axle 23 and is free to rotate with respect to a block 24.

The first axle 23 is disposed inside a first opening 25 (best shown in FIG. 5) that extends all the way through the block 24. The opening 25 is lined with a set of bearings 28 (shown in FIG. 5) on each side of the opening 25. The first axle 23 is supported by and is rotated through contact with the bearings 28.

The index plate 22 has a plurality of apertures 31 disposed around its circumference. The apertures 31 positioned near the center of the index plate 22 provide for securing a first pin 34 (shown in FIG. 3), and the apertures 31 positioned near the perimeter of the index plate 22 provide for securing a second pin 37 (shown in FIG. 3). There are several additional apertures 31 that provide for attaching the index plate 22 to the outer plate 12.

The handle 16 attaches to the top of the block 24 and is positioned near the first pin 34.

Figure 3:
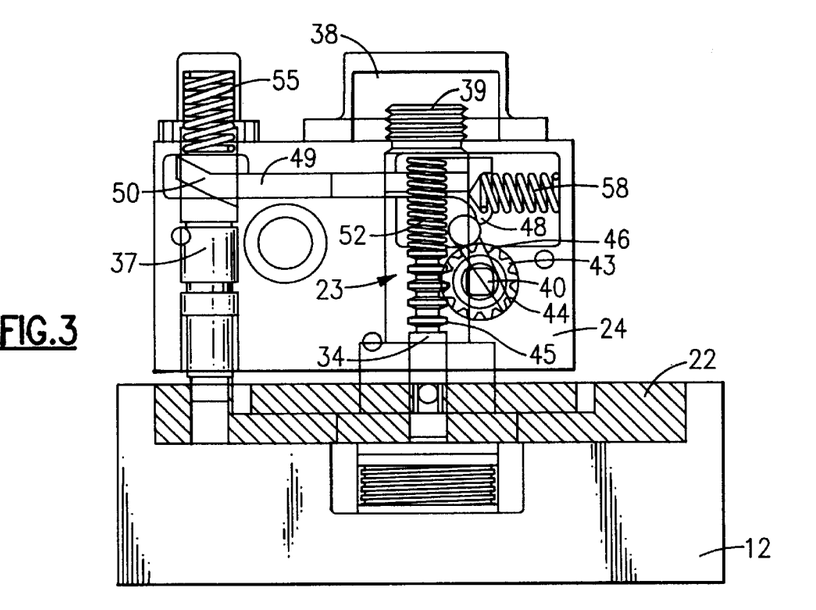
FIG. 3 is a top plan view of the rotating turret of the present invention.
Figure 4:
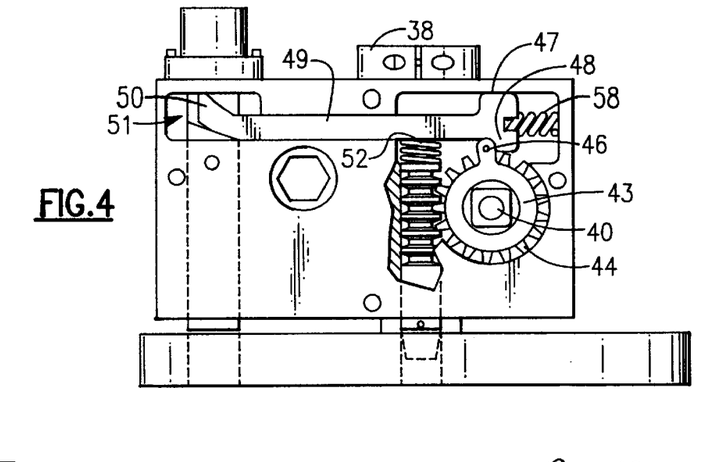
FIG. 4 is a top plan view of the rotating turret of the present invention with the outer plate and the handle removed

Turning to FIGS. 3 and 4, the first axle 23 is shown extending through the block 24 where a collar 38 attaches to a threaded portion 39 on the back of the axle 23.

A second axle 40 has a gear 43 with gear teeth 44 and a gear tab 46 attached to it. The gear teeth 44 engage with a set of gear teeth 45 that are integrally formed in the first pin 34. The gear tab 46 engages a shoulder 48 positioned on a first end 47 of a sliding wedge 49. By turning the handle 16, the gear 43 drives the first pin 34 away from the index plate 22, and the gear tab 46 drives the sliding wedge 49. An opposite second end 73 of the sliding wedge 49 has a curved portion 50 that engages with a slot 51 that is cut through the second pin 37. The slot 51 is cut at an angle such that the movement of the curved portion 50 of the sliding wedge 49 causes the second pin 37 to move away from the index plate 22. The first pin 34 is biased toward the index plate 22 by a first spring 52, and the second pin 37 is similarly biased by a second spring 55. A third spring 58 is connected to the back of the sliding wedge 49 and provides a bias to keep the curved portion 50 extending through the second pin 37.

Figure 5:
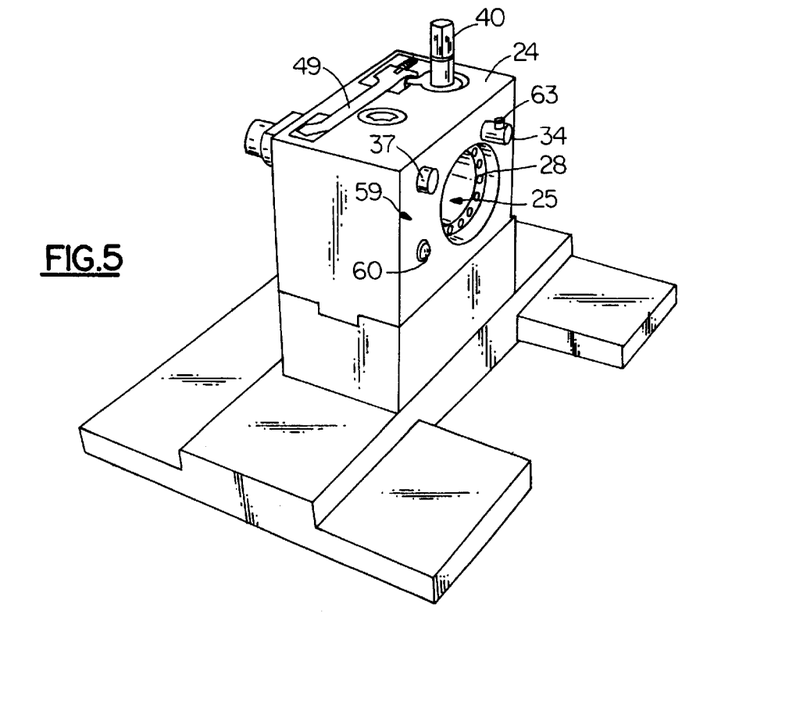
FIG. 5 is a perspective view of the block of the present invention.

In FIG. 5, the handle 16 and index plate 22 have been removed to show the first pin 34, the second pin 37, the first opening 25 and a detent mechanism 59. The detent mechanism 59 comprises a spring-loaded ball 60 capable of engaging with a series of cuplike openings 61 (shown in FIG. 6a) in the back of the index plate 22. The compression of the spring is adjustable by means of a setscrew (not shown) that is accessible from the back of the block 24.

Figure 6A:
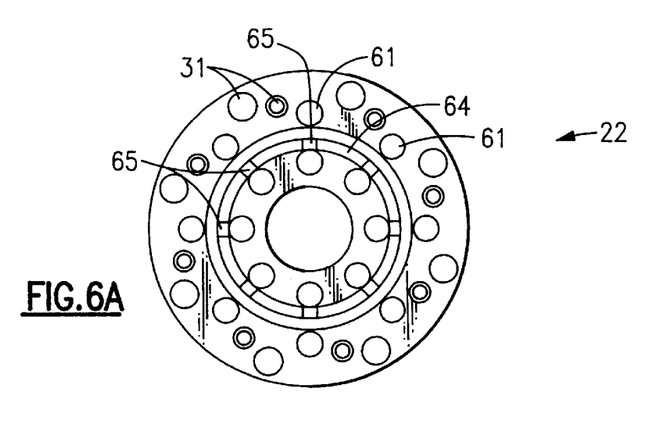
FIG. 6a is a plan view of the inside of the index plate.
Figure 6B:
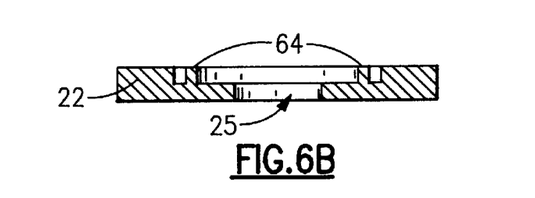
FIG. 6b is an elevation view of the index plate.

Extending upward from the first pin 34 is a projection 63. Turning to FIGS. 6a and 6b, the projection 63 engages with a bearing surface 64. The inside of the index plate 22 that faces the block 24 has the bearing surface 64 which is concentric with the index plate 22. The bearing surface 64 has slots 65 where material has been removed. When the first pin 34 and the second pin 37 are retracted from the index plate 22 by turning the handle 16 (shown in FIG. 8), the projection 63 also moves out of the slot 65. If the turret 10 is then rotated a few degrees while maintaining pressure on the handle 16, the handle 16 can then be released and the turret 10 will not lock down because the projection 63 on the first pin 34 engages with the bearing surface 64 to prevent the first pin 34 from moving forward. The force of the springs 52, 55, and 58 combines and is transmitted through the linkage to push the projection 63 into the bearing surface 64. As soon as the projection 63 encounters the next slot 65, the first pin 34 shoots forward into the index plate 22 due to the force of the springs 52, 55, and 58.

When the projection 63 is sliding on the bearing surface 64, the first pin 34 and the second pin 37 do not make contact with any moving parts. Accordingly, the projection 63 provides a wear surface that can be hardened and that prevents the first pin 34 and the second pin 37 from coming into contact with and wearing on the index plate 22. Also, the projection 63 provides a locator so that the first pin 34 and the second pin 37 are only released to move forward under the force of the springs when the pins are in alignment with the apertures in the index plate 22. Otherwise, misalignment could cause the pins 34 and 37 to wear out and ream the apertures 31 over time.

Figure 7:
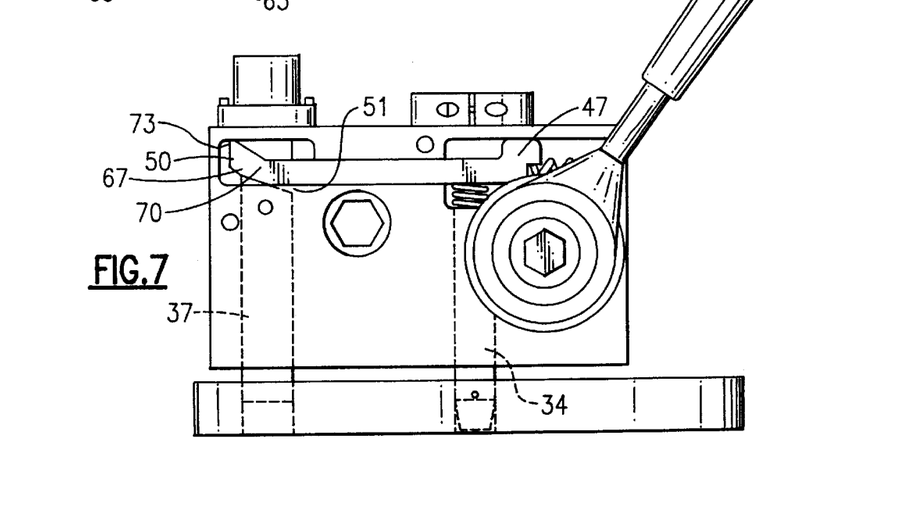
FIG. 7 is a top plan view of the rotating turret of the present invention in the locked position.
Figure 7A:
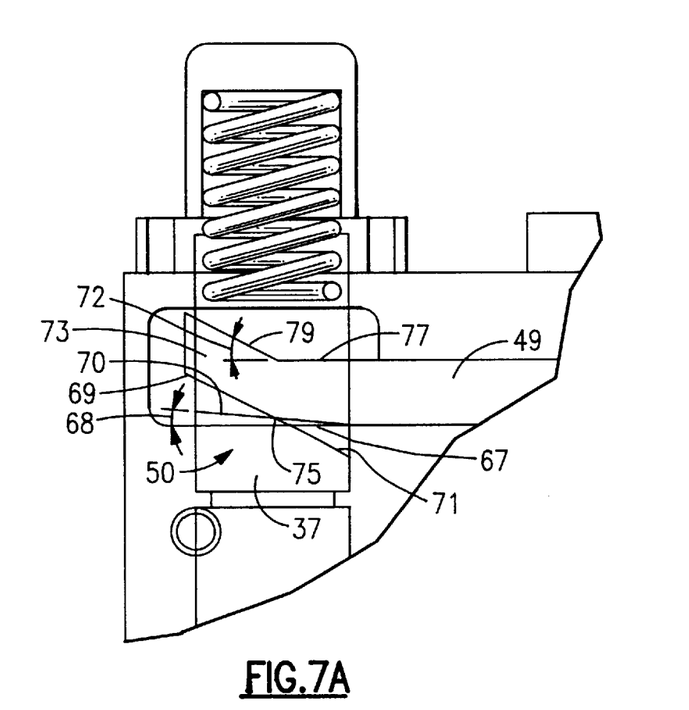
FIG. 7a is a detail top plan view of the sliding wedge and second pin.

In FIG. 7, the turret 10 is in the locked position with the first pin 34 and the second pin 37 inserted into the apertures 31 in the index plate 22. In this position the curved portion 50 of the sliding wedge 49 extends through the slot 51 in the second pin 37. The position of the wedge 49 enables the force of the second spring 55 to push the second pin forward into the index plate 22. Referring also to FIG. 7a, the second end 73 of the sliding wedge 49 has a bottom side 75 and a top side 77. The bottom side 75 has a first section 67 which is preferably angled 68 at less than seven degrees relative to the first end 47 of the wedge. Optionally, other angles 68 may be employed as would be known to those skilled in the art. A first sidewall 70 of the slot 51 is similarly slightly angled 68 so that the first sidewall 70 is generally parallel to the first section 67. The bottom side 75 has a second section 69 which is preferably angled 72 between twenty-five and thirty degrees relative to the first section 67 of the bottom side 75. Optionally, other angles 72 may be employed as would be known to those skilled in the art. A second sidewall 71 of the slot 51 is similarly slightly angled 72 relative to the first sidewall 70, so that the second sidewall 71 is generally parallel to the second section 69. The top side 77 of the second end 73 of the wedge 49 has a first section 79 which is preferably angled 72 between twenty-five and thirty degrees relative to the first end 47 of the wedge 49. Optionally, other angles 72 may be employed as would be known to those skilled in the art. When the second pin 37 is in the locked position, the first section 67 of the bottom side 75 of the secnd end 73 wedge engages with the first sidewall 70 of the slot 51. The engagement of the first section of the wedge 49 with the first sidewall 70 of the slot 51 provides structural rigidity to the turret 10 because the two surfaces will not slip because of their angles 68 and because the second end 73 of the wedge 49 cannot move laterally within the slot 51. Accordingly, the wedge 49 prevents any flex of the outer plate 12 or the index plate 22 by reinforcing the second pin 37. Rigidity is important because of the axial forces on the turret 10 during machining.

The positioning of the second pin 37 also provides a moment arm which increases the locking force of the pins 34 and 37 to prevent any rotation from occurring once the turret 10 is locked into position.

Figure 8:
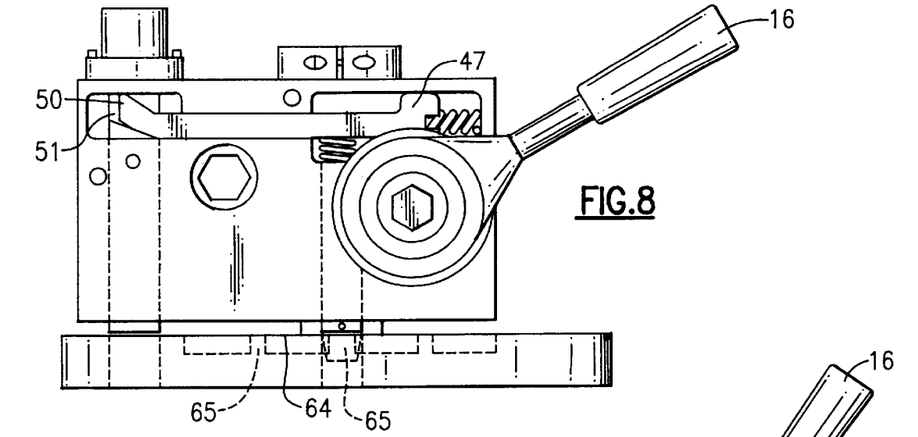
FIG. 8 is a top plan view of the rotating turret of the present invention in the unlocked position; and, FIG. 9 is a sectional view taken along line 9—9 of FIG. 1.

In FIG. 8, the handle 16 has been rotated clockwise to retract the pins 34 and 37 from the index plate 22 to allow for rotation of the turret 10. The wedge 49 moves through the slot 51 in the second pin 37 such that the second pin 37 is retracted from the index plate 22 against the force of the second spring 55. With the handle 16 in this position, the turret 10 can be rotated freely for any number of turns. If the handle 16 is released in this position, the turret 10 can be turned until the bearing surface 64 (best shown in FIG. 6) opens to the slot 65. Once the bearing surface 64 opens to the slot 65, the turret 10 automatically locks into position due to the force of the springs 52, 55, and 58.

In operation, when the handle 16 on the second axle 40 is turned, the gear teeth 44 connected to the second axle 40 engage with the set of gear teeth 45 on the first pin 34 and the first pin 34 is retracted from the aperture 31 in the index plate 22 against the force of the first spring 52. At the same time, a gear tab 46 on the second axle 40 mechanically engages with a shoulder 48 on the sliding wedge 49 to pull the sliding wedge 49 through the slot 51 in the second pin 37. As the wedge 49 travels through the slot 51 in the second pin 37, the wedge 49 pushes the second pin 37 away from the index plate 22 against the force of the second spring 55. Both the second pin 37 and the sliding wedge 49 are spring-biased toward the locked position. Once the handle 16 is turned and the two pins 34 and 37 retract from the index plate 22, the turret 10 is in the unlocked position and can rotate freely about the first axle 23. The turret 10 can be maintained in the free rotating position by keeping pressure on the handle 16 to overcome the force of the springs 52, 55, and 58. By unlocking the turret 10 with the handle 16 and then rotating the turret 10 slightly, the projection 63 on the first pin 34 is removed from the slot 65 and is engaged with the bearing surface 64 on the inside of the index plate 22. In this manner the contact between the projection 63 on the first pin 34 and the bearing surface 64 prevents the springs 52, 55, and 58 from pushing the first pin 34 or the second pin 37 into the index plate 22 and therefore, enables the operator to release the handle 16 and still be able to rotate the turret 10. With the handle 16 released, the turret 10 can only be rotated for a portion of the arc of the turret 10. Once the turret 10 has been rotated around its arc to the next tool 13 position, the slot 65 cut into the bearing surface 64 allows the projection 63 to shoot forward into the slot 65 under the force of the springs 52, 55, and 58. Accordingly, with the handle 16 released, the turret 10 can only be advanced around the arc until the projection 63 reaches the next slot 65 in the bearing surface 64.

Figure 9:
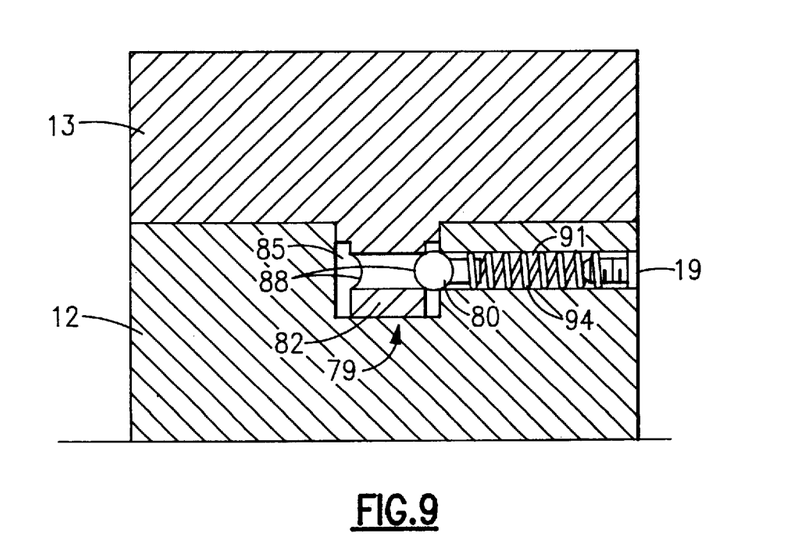

In FIG. 9, the tool 13 removably attaches to the outer plate 12 by means of a locking mechanism 79 that includes a ball 80 and a pin 82. The pin 82 slides into an opening 85 that is also accessible by the ball 80. The pin 82 has a groove 88 formed in it which accepts a portion of the ball 80 to hold the pin 82 in the opening 85. The ball 80 is held captively in a slot 91 so that it can extend into the opening 85 but cannot fall into the opening 85 when the pin 82 is removed. The ball 80 has a spring 94 pushing it toward the opening 85. The Allen screw 19 adjusts the compression of the spring 94. The locking mechanism 79 provides for quick changes of the tools 13, yet holds the tools 13 securely during machining operations. In operation, the locking mechanism 79 requires only a few turns of the Allen screw 19 to allow for releasing the compression on the spring 94 and removing the tool 13. Once a new tool 13 is inserted the Allen screw 19 is turned the opposite way to increase the compression of the spring 94 to force the ball 80 into the groove 88 to lock the tool 13 into position.

The present invention offers several advantages including a quick release mechanism that makes disengaging the turret fast and simple in comparison with other apparatus. Another advantage to the present apparatus is that it requires very little maintenance and it is designed to minimize wear on the parts such as the pins 34 and 37. Also, the arrangement of the sliding wedge 49 to reinforce the second pin 37 and the positioning of the pins 34 and 37 provides for excellent structural rigidity against twist and flexing of the outer plate 12 and index plate 22.

Yet another advantage of the present invention is that the apparatus provides for safe adjustment of the turret 10 while minimizing the possibility of injury to the operator or damage to the work. When the handle 16 is released there are two ways of preventing unexpected rotation of the turret 10 due to the weight of the tool 13. First, if the handle 16 is released the turret 10 can only rotate to the next tool position because the spring loaded system will lock down the turret 10 as soon as the projection 63 is able to enter the next slot 65 in the bearing surface 64. Second, as a safety backup there is the detent mechanism 59 which provides the spring-loaded ball 60 that engages the series of cup like apertures 61 on the inside of the index plate 22. The rotation of the turret 10 is restricted by the pressure of the detent mechanism 59 against the index plate 22.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A rotating turret for an engine lathe, comprising:
   a) a block having a first opening, a second opening, and a third opening, defined therein;
   b) a first axle capable of rotatably moving inside the first opening in the block;
   c) an index plate fixed to the axle and having a plurality of apertures defined therein;
   d) a first pin capable of fitting through the second opening in the block and into one of the apertures in the index plate;
   e) a second axle having a handle and being mechanically engaged with the first pin such that when the handle is rotated the first pin retracts from the aperture in the index plate, the second axle being spring-biased;
   f) a second pin capable of fitting through the third opening in the block into one of the apertures in the index plate, the second pin having a slot defined therein and being spring-biased; and,
   g) a sliding wedge mechanically engaged with the second axle and capable of frictionally engaging with the slot in the second pin such that when the handle is rotated the second pin retracts from the aperture in the index plate.

2. The rotating turret of claim 1, wherein the second axle is spring-biased by a first spring mechanically engaged with the sliding wedge.

3. The rotating turret of claim 1, wherein the second axle is spring-biased by a second spring mechanically engaged with the first pin.

4. The rotating turret of claim 2, wherein the second axle is spring-biased by a second spring mechanically engaged with the first pin.

5. The rotating turret of claim 1, wherein the block has a fourth opening.

6. The rotating turret of claim 5, further comprising a detent mechanism disposed inside the fourth opening and engaging with the apertures on the index plate.

7. The rotating turret of claim 6, wherein the detent mechanism comprises a ball being adjustably spring-biased toward the index plate and engaging with the apertures on the index plate.

8. The rotating turret of claim 1, wherein the sliding wedge has a first end with a shoulder extending therefrom and the second axle has a gear tab extending therefrom and capable of mechanically engaging the shoulder to linearly slide the wedge.

9. The rotating turret of claim 1, wherein the sliding wedge has a second end with a portion angled relative to the first end and capable of mechanically engaging the slot of the second pin.

10. The rotating turret of claim 9, wherein the second end of the sliding wedge has a bottom side with a first section and a second section, the first section being angled from the first end of the wedge and the second section being angled from the first section.

11. The rotating turret of claim 10, wherein the first section is angled from the first end at an angle of less than about seven degrees.

12. The rotating turret of claim 11, wherein the second section is angled from the first section at an angle in the range of twenty five to thirty five degrees.

13. The rotating turret of claim 10, wherein the second end of the sliding wedge has a top side with a first section being angled from the first end of the wedge.

14. The rotating turret of claim 12, wherein the second end of the sliding wedge has a top side with an angled section being angled from the first end of the wedge.

15. The rotating turret of claim 14, wherein the angled section of the top side of the second end of the wedge is angled from the first end of the wedge at an angle of twenty five to thirty five degrees.

16. The rotating turret of claim 15, wherein the slot in the second pin has a first sidewall and a second sidewall, the first side wall being substantially parallel to the first section of the bottom side of the sliding wedge, the second sidewall being substantially parallel to the second section of the bottom side of the sliding wedge.

17. The rotating turret of claim 1, further comprising an outer plate attached to the index plate, the outer plate having a plurality of tool locking mechanisms located around its perimeter.

18. The rotating turret of claim 17, wherein the outer plate has an opening and a slot defined therein, the opening and the slot intersecting at a point inside the outer plate.

19. The rotating turret of claim 18, further comprising:
a) a tool having a pin attached thereto, the pin having a groove defined therein, the pin capable of sliding into the opening in the outer plate;
b) a ball captively held in the slot and capable of partially entering the opening in the outer plate so that it is capable of engaging with the groove in the pin;
c) a spring disposed inside the slot near the ball such that the spring is capable of engaging with the ball so that the ball is forced toward the opening; and,
d) a screw capable of compressing the spring inside the slot in the outer plate.

20. A rotating turret for an engine lathe, comprising:
a) a block having a first opening, a second opening, and a third opening, defined therein;
b) a first axle capable of rotatably moving inside the first opening in the block;
c) an index plate fixed to the axle and having a plurality of apertures defined therein, the index plate having a circular bearing surface with a plurality of openings defined therein;
d) a first pin capable of fitting through the second opening in the block and into one of the apertures in the index plate, the first pin having a plurality of gear teeth and having a projection extending therefrom;
e) a spring-biased, second axle having a handle, a gear, and a gear tab attached thereto, the gear being mechanically engaged with the gear teeth on the first pin such that when the handle is rotated the first pin retracts from the aperture in the index plate;
f) a second pin capable of fitting through the third opening in the block into one of the apertures in the index plate, the second pin having a slot defined therein and being spring-biased; and,
g) a sliding wedge having a shoulder, the shoulder being mechanically engaged with the gear tab on the second axle, the sliding wedge being capable of frictionally engaging with the slot in the second pin such that when the handle is rotated the second pin retracts from the aperture in the index plate.

21. The rotating turret of claim 20, wherein the second axle is spring-biased by a first spring mechanically engaged with the sliding wedge.

22. The rotating turret of claim 20, wherein the second axle is spring-biased by a second spring mechanically engaged with the first pin.

23. The rotating turret of claim 21, wherein the second axle is spring-biased by a second spring mechanically engaged with the first pin.

24. The rotating turret of claim 20, wherein the block has a fourth opening.

25. The rotating turret of claim 24, further comprising a detent mechanism disposed inside the fourth opening and engaging with the apertures on the index plate.

26. The rotating turret of claim 25, wherein the detent mechanism comprises a ball being adjustably spring-biased toward the index plate and engaging with the apertures on the index plate.

* * * * *